United States Patent [19]
Freedman et al.

[11] 3,968,096

[45] July 6, 1976

[54] PHOTODEGRADABLE POLYOLEFINS CONTAINING AN HALOGENATED NITRILE

[75] Inventors: Bernard Freedman, Berkeley; Martin J. Diamond, Oakland, both of Calif.

[73] Assignee: The United States of America as represented by the Secretary of Agriculture, Washington, D.C.

[22] Filed: Aug. 8, 1975

[21] Appl. No.: 603,080

Related U.S. Application Data

[62] Division of Ser. No. 543,706, Jan. 23, 1975.

[52] U.S. Cl. .............................. 526/914; 260/32.4; 260/DIG. 43; 526/21; 526/30; 526/351; 526/352
[51] Int. Cl.$^2$ ............................................ C08J 3/20
[58] Field of Search .... 260/DIG. 43, 32.4, 94.9 GC, 260/86.1 R, 87.3, 93.7, 93.5 A; 96/115 P

[56] References Cited

UNITED STATES PATENTS

| | | | |
|---|---|---|---|
| 3,262,965 | 7/1966 | Janz | 260/465.3 |
| 3,495,987 | 2/1970 | Moore | 96/115 P |
| 3,907,569 | 9/1975 | Hazy et al. | 96/115 P |

OTHER PUBLICATIONS

"Polymer Preprints" vol. 13, No. 2, Aug. 1972, Scott p. 627.

*Primary Examiner*—Eugene C. Rzucidlo
*Attorney, Agent, or Firm*—M. Howard Silverstein; W. Takacs; David G. McConnell

[57] ABSTRACT

Polyolefins capable of photodegradation are prepared by incorporating in the polyolefin an additive containing chlorine, bromine, or iodine and either a nitrogen or a sulfur group.

2 Claims, No Drawings

PHOTODEGRADABLE POLYOLEFINS CONTAINING AN HALOGENATED NITRILE

This is a division of our copending application Ser. No. 543,706, filed Jan. 23, 1975.

DESCRIPTION OF THE INVENTION

The invention relates to and has among its objects the provision of novel plastic compositions capable of photodegradation. Further objects of the invention will be evident from the following description wherein parts and percentages are by weight unless otherwise specified.

Plastics have become an important part of the American way of life. Innumerable articles of manufacture are made of plastics. One of the main uses thereof is in the manufacture of containers for liquids and solids of all kinds, particularly foods. Another important use is the manufacture of plastic sheet materials such as films and foils. For example, plastic films are used in agriculture for covering the soil between plants, thereby to prevent the growth of weeds.

One problem with plastics is that they are not easily decomposed. Thus, for example, plastic food containers thrown by the roadside do not decompose but remain until collected, thereby polluting the environment. Similarly, plastic films used as soil coverings must be removed from the fields prior to initiating a new crop.

The invention described herein concerns a means for obviating the above problems in that it provides polyolefin plastics which are capable of photodegradation. Containers fabricated from the plastics of the invention when exposed to sunlight will gradually decompose and eventually crumble away. Thus, such containers when thrown along the roadside will eventually become part of the soil. Films prepared from the plastics of the invention when used for agricultural purposes will gradually become friable by the action of sunlight so that they can be readily plowed into the soil.

The benefits of the invention are realized by incorporating into a polyolefin any of the compounds described below.

Group I. Cyanohalomethanes of the structure $$C(CN)_r X_q$$

wherein:
X is chlorine, bromine, or iodine
r is 1, 2, or 3
q is 4−r

Illustrative examples of compounds included in Group I are:
Trichloroacetonitrile
Tribromoacetonitrile
Triiodoacetonitrile
Dichloromalononitrile
Dibromomalononitrile
Diiodomalononitrile
Chlorotricyanomethane
Bromotricyanomethane
Iodotricyanomethane Group II. Nitrobenzenesulfenyl halides of the structure

wherein:
X is chlorine, bromine, or iodine
n is 1 or 2

Illustrative examples of compounds included in Group II are:
2,4-Dinitrobenzenesulfenyl chloride
2,4-Dinitrobenzenesulfenyl bromide
2,4-Dinitrobenzenesulfenyl iodide Group III. Haloalkylsulfenyl halides of the structure $$X-S-(CH_b X_a)_c-R$$

wherein:
X is chlorine, bromine, or iodine
R is hydrogen, chlorine, bromine, iodine, or an alkyl radical containing 1 to 6 carbon atoms
a is 1 or 2
b is 2−a
c is 1 or 2

Illustrative examples of compounds included in Group III are:
Trichloromethylsulfenyl chloride
Tribromomethylsulfenyl chloride
Triiodomethylsulfenyl chloride
Trichloromethylsulfenyl bromide
Trichloromethylsulfenyl iodide
Tribromomethylsulfenyl bromide
Tribromomethylsulfenyl iodide
Triiodomethylsulfenyl bromide
Triiodomethylsulfenyl iodide
1,1,2,2-Tetrachloroethylsulfenyl chloride
1,1,2,2-Tetrachloroethylsulfenyl bromide
1,1,2,2-Tetrachloroethylsulfenyl iodide
1,1,2,2-Tetrabromoethylsulfenyl chloride
1,1,2,2-Tetrabromoethylsulfenyl bromide
1,1,2,2-Tetrabromoethylsulfenyl iodide
1,1,2,2-Tetraiodoethylsulfenyl chloride
1,1,2,2-Tetraiodoethylsulfenyl bromide
1,1,2,2-Tetraiodoethylsulfenyl iodide Group IV. Halobenzenesulfonyl halides of the structure

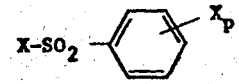

wherein:
X is chlorine, bromine, or iodine
p is an integer from 1 to 5

Illustrative examples of compounds included in Group IV are:
2-Chlorobenzenesulfonyl chloride
2-Chlorobenzenesulfonyl bromide
2-Chlorobenzenesulfonyl iodide
2,4,5-Trichlorobenzenesulfonyl chloride
2,4,5-Trichlorobenzenesulfonyl bromide
2,4,5-Trichlorobenzenesulfonyl iodide
Pentabromobenzenesulfonyl chloride
Pentabromobenzenesulfonyl bromide
Pentabromobenzenesulfonyl iodide Group V. Haloalkylsulfonyl halides of the structure $$X-SO_2-(CH_b X_a)_c-R$$

wherein:

X is chlorine, bromine, or iodine
R is hydrogen, chlorine, bromine, iodine, or an alkyl radical containing 1 to 6 carbon atoms
$a$ is 1 or 2
$b$ is $2-a$
$c$ is 1 or 2

Illustrative examples of compounds included in Group V are:
Trichloromethanesulfonyl chloride
Tribromomethanesulfonyl chloride
Triiodomethanesulfonyl chloride
Trichloromethanesulfonyl bromide
Trichloromethanesulfonyl iodide
Tribromomethanesulfonyl bromide
Tribromomethanesulfonyl iodide
Triiodomethanesulfonyl bromide
Triiodomethanesulfonyl iodide
1,1,2,2-Tetrachloroethanesulfonyl chloride
1,1,2,2-Tetrachloroethanesulfonyl bromide
1,1,2,2-Tetrachloroethanesulfonyl iodide
1,1,2,2-Tetrabromoethanesulfonyl chloride
1,1,2,2-Tetrabromoethanesulfonyl bromide
1,1,2,2-Tetrabromoethanesulfonyl iodide
1,1,2,2-Tetraiodoethanesulfonyl chloride
1,1,2,2-Tetraiodoethanesulfonyl bromide
1,1,2,2-Tetraiodoethanesulfonyl iodide Group VI. Haloalkyl disulfides of the structure $$R-(CH_bX_a)_c-S-S-(CH_bX_a)_c-R$$

wherein:
X is chlorine, bromine, or iodine
$a$ is 1 or 2
$b$ is $2-a$
$c$ is 1 or 2
R is hydrogen, chlorine, bromine, iodine, or an alkyl radical containing 1 to 6 carbon atoms Illustrative examples of compounds included in Group VI are:
Bis-(trichloromethyl) disulfide
Bis-(tribromomethyl) disulfide
Bis-(triiodomethyl) disulfide
Bis-(1,2,2,2-tetrachloroethyl) disulfide
Bis-(1,2,2,2-tetrabromoethyl) disulfide
Bis-(1,2,2,2-tetraiodoethyl) disulfide
Bis-(1,1,2,2-tetrachloroethyl) disulfide
Bis-(1,1,2,2-tetrabromoethyl) disulfide
Bis-(1,1,2,2-tetraiodoethyl) disulfide Group VII. Halonitroalkanes of the structure $$O_2N-(CH_bX_a)_c-R$$

wherein:
X is chlorine, bromine, or iodine
R is hydrogen, chlorine, bromine, iodine, or an alkyl radical containing 1 to 6 carbon atoms
$a$ is 1 or 2
$b$ is $2-a$
$c$ is 1 or 2

Illustrative examples of compounds included in Group VII are:
Chloropicrin
Bromopicrin
Iodopicrin
Perchloronitroethane
Perbromonitroethane
Periodonitroethane Polyolefins containing any of the above compounds (or additives as they are often referred to herein) decompose readily when exposed to sunlight. The decomposition, however, is not instantaneous but is gradual, and the rate thereof depends on such factors as the type of polyolefin, the amount of the compound added, and the activity of the latter. The reaction which takes place can be described as a photodepolymerization in which the polymeric chains are reduced to lower molecular weight under the influence of sunlight.

The amount of additive to be incorporated with the polyolefin depends on the activity of the additive, and upon the desired rate of photodecomposition. In general, one may use about 0.1 to 10% of the additive, based upon the weight of polyolefin. For most purposes, about 1 to 5% of the additive is sufficient to obtain a reasonable and useful rate of photodegradation.

The polyolefin to which the invention is applied includes, for example, high and low density polyethylene, polypropylene, polybutylene, polystyrene, mixtures of polyethylene and polypropylene, vinyl acetate/ethylene copolymers, and the like. The incorporation of the additive with the polyolefin may be carried out in any of the ways known in the art of compounding plastics. For example, intimate mixing of the polyolefin and additive may be effected by melting and mixing the polyolefin with the additive by any suitable means such as a mixer of the Banbury or Werner type or in a screw extruder. The compositions of polyolefin and additive can be formed into any desired articles such as films, tubular sheets, foils, bags, bottles, or other containers by application of well-known molding and fabricating techniques.

It is within the compass of the invention to use known photosensitizing compounds such as dibenzoyl peroxide, azo-bis-isobutyronitrile, and the like in conjunction with the additives of the invention. In some instances such photosensitizers increase the activity of the additives of the invention. Thus, polyolefins containing an additive in accordance with the invention and a photosensitizer will exhibit an enhanced rate of photodegradation.

EXAMPLES

The invention is further demonstrated by the following illustrative examples.

EXAMPLE 1

Photodegradable Polypropylene Films

A. To 0.6 gram of powdered polypropylene resin was added a solution of 0.006 gram of additive in 0.6 ml. of acetone. The mixture was stirred to evenly distribute the additive solution over the particles of polypropylene. The mixture was spread as a thin layer on a Mylar sheet supported by a ferrotype chrome plate. After allowing the acetone to evaporate, the said layer was covered with another Mylar sheet and chrome plate. This assembly was heated for 30 sec. at 350° F. and then pressed at 370 psi. for 30 sec. The assembly was then transferred to an unheated press and pressed at 4000 psi. while cooling. A film of polypropylene and 1% additive having a thickness of 0.003 to 0.004 inch was thus obtained.

A similar procedure was employed for the preparation of polypropylene films containing other additives. In cases wherein the melting point of the additive was above 350° F., the temperature of the press was maintained at about 10° F. above this melting point and within the range of 350°–412° F. A piece, ¾ inches × 1⅜ inches, was cut from each film and its infrared spectrum was taken.

B. Test procedure: The films prepared as above described were placed in a stainless steel rack exposed to sunlight. This rack was mounted on a building located at Albany, California, and was positioned facing south and at an angle of 45° to the horizontal. The films were thus exposed continuously for a period of approximately one month, that is, from Sept. 14 to Oct. 11 of one calender year. After this exposure, an infrared spectrum of the sample was again determined. The extent of photooxidation was taken as a measure of the photodegradability of the irradiated material. Photooxidation was determined by measuring the increase in the carbonyl absorption band of the exposed sample over that of an irradiated sample containing no additive.

C. Specific additives used: The sequence described above in parts A and B was performed with the following additives, each in the amount of from 3 to 5%, based on the weight of polypropylene:

a. Dibromomalononitrile $Br_2C(CN)_2$ b. Trichloromethanesulfonyl chloride $Cl—SO_2—CCl_3$ c. 2,4,5-Trichlorobenzenesulfonyl chloride

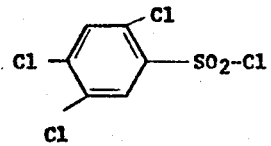

d. Chloropicrin $O_2N—C—Cl_3$ e. 1,1,2,2-Tetrachloroethylsulfenyl chloride

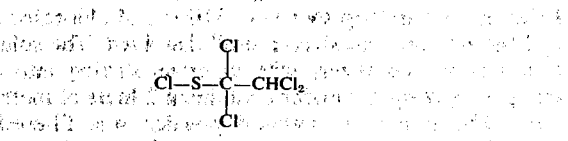

f. Bis-(1,2,2,2-tetrachloroethyl) disulfide $Cl_3C—CH(Cl)—S—S—CH(Cl)—CCl_3$

The results are summarized below.

Table 1

| Run | Additive | Polypropylene and Additive Amount of additive, % | Increase in carbonyl, absorbance units | Additive effectiveness ratio* |
|---|---|---|---|---|
| a. | Dibromomalononitrile | 3 | 0.234 | 31.2 |
| b. | Trichloromethanesulfonyl chloride | 3 | 0.044 | 5.9 |
| c. | 2,4,5-Trichlorobenzenesulfonyl chloride | 5 | 0.158 | 21.1 |
| d. | Chloropicrin | 5 | 0.023 | 3.1 |
| e. | 1,1,2,2-Tetrachloroethylsulfenyl chloride | 5 | 0.175 | 23.3 |
| f. | Bis-(1,2,2,2-Tetrachloroethyl) disulfide | 5 | 0.031 | 4.1 |
| Control | None used | | 0.008 | 1.0 |

*Additive effectiveness ratio is equal to the increase in carbonyl for a particular additive divided by the increase in carbonyl obtained without additive (control). Thus, for example, polypropylene containing dibromomalononitrile is oxidized photochemically 0.234/0.008 or 31.2 times more than polypropylene without an additive.

EXAMPLE 2

Photodegradable Polyethylene Films

Polyethylene films containing 2 to 5% of additive were prepared by the same procedure described in Example 1. Photodegradability of the resulting films was determined as described in Example 1. The following additives were used:

Runs a to f: Same additives as Example 1
g. Trichloromethylsulfenyl chloride $Cl—S—C—Cl_3$ h. 2,4-Dinitrobenzenesulfenyl chloride

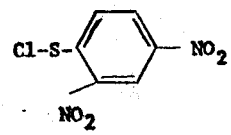

The results are summarized below.

Table 2

| Run | Additive | Polyethylene and Additive Amount of additive, % | Increase in carbonyl, absorbance units | Additive effectiveness ratio |
|---|---|---|---|---|
| a. | Dibromomalononitrile | 5 | 0.056 | 4.3 |
| b. | Trichloromethanesulfonyl chloride | 5 | 0.021 | 1.6 |
| c. | 2,4,5-Trichlorobenzenesulfonyl chloride | 5 | 0.052 | 4.0 |
| d. | Chloropicrin | 5 | 0.037 | 2.8 |
| e. | 1,1,2,2-Tetrachloroethylsulfenyl chloride | 5 | 0.071 | 5.5 |
| f. | Bis-(1,2,2,2-tetrachloroethyl) disulfide | 5 | 0.067 | 5.2 |
| g. | Trichloromethylsulfenyl chloride | 2 | 0.021 | 1.6 |
| h. | 2,4-Dinitrobenzenesulfenyl chloride | 5 | 0.020 | 1.5 |
| Control | None used | | 0.013 | 1.0 |

EXAMPLE 3

Photodegradable Polystyrene Films

A. Commercial polystyrene powder was first purified as follows: The powder (90 g.) was placed in a 2-liter Erlenmeyer flask together with 510 ml. of chloroform and the mixture was shaken until dissolved. The solution was poured slowly with vigorous stirring into a one-gallon Waring Blender containing 2 liters of methanol. The finely precipitated powder was filtered, washed with methanol, air-dried, and finally dried in a vacuum oven at 52° C. and 30 p.s.i. This procedure was repeated for a total of three times and a polystyrene containing no styrene odor was obtained.

B. Incorporation of additive: A wide-mouth jar was charged with 3 g. of the purified polystyrene powder, 0.15 g. of additive, and 17 ml. of chloroform, then shaken on a wrist-action shaker until solution was obtained. The solution was allowed to stand for a few minutes to remove entrapped air bubbles. Afterward, the solution was spread on a 4 X 8 inch glass plate with a film-casting knife with a setting of 0.038 inch. The plate was suspended above chloroform in a covered tray to retard evaporation of the solvent. After the plate had dried overnight, it was placed in a tray containing distilled water, which floated the film away from the glass. This film of polystyrene plus the incorporated additive was about 0.004 to 0.005 inch thick. A piece, $\mu$ inch X 1⅜ inches was cut from the film and its infrared spectrum was taken.

C. Test procedure: The said piece of film was then irradiated for 66 hours by maintaining it on a revolving table 9 in. in diameter with the film sample 6 in. from a 275-watt RS sunlamp. After irradiation, an infrared spectrum of the sample was again determined. The extent of photooxidation was taken as a measure of the photodegradability of the irradiated material. Photooxidation was determined by measuring the increase in the carbonyl absorption band of the irradiated sample over that of an irradiated sample containing no additive.

D. Specific additives used: The sequence described above in parts A, B, and C was perfomed with all of the additives mentioned in Example 2.

The results are tabulated below:

Table 3

| Run | Additive | Polystyrene and Additive Amount of additive, % | Increase in carbonyl, absorbance units | Additive effectiveness ratio |
|---|---|---|---|---|
| a. | Dibromomalononitrile | .5 | 0.334 | 3.0 |
| b. | Trichloromethanesulfonyl chloride | .5 | 1.012 | 9.0 |
| c. | 2,4,5-Trichlorobenzenesulfonyl chloride | .5 | 0.735 | 6.6 |
| d. | Chloropicrin | .5 | 0.137 | 1.2 |
| e. | 1,1,2,2-Tetrachloroethylsulfenyl chloride | .5 | 0.414 | 3.7 |
| f. | Bis-(1,2,2,2-tetrachloroethyl) disulfide | .5 | 0.510 | 4.6 |
| g. | Trichloromethylsulfenyl chloride |  | 0.422 | 3.8 |
| h. | 2,4-Dinitrobenzenesulfenyl chloride | .5 | 0.227 | 2.0 |
| Control | None used |  | 0.112 | 1.0 |

Having thus described our invention, we claim:

1. A photodegradable composition comprising a polyolefin and about from 0.1 to 10% of an additive of the structure $$C(CN)_rX_q$$

wherein:
X is chlorine, bromine, or iodine
$r$ is 1, 2, or 3
$q$ is 4−r.

2. The composition of claim 1 wherein the additive is dibromomalononitrile.

* * * * *